United States Patent [19]
Crawford et al.

[11] Patent Number: 4,938,338
[45] Date of Patent: Jul. 3, 1990

[54] PLASTIC CUTLERY FEEDER

[75] Inventors: Donald C. Crawford; Kenneth H. LaCount, both of Green Bay, Wis.

[73] Assignee: FMC Corporaton, Chicago, Ill.

[21] Appl. No.: 269,081

[22] Filed: Nov. 9, 1988

[51] Int. Cl.⁵ .......................................... B65G 47/244
[52] U.S. Cl. ................... 198/408; 198/463.4; 198/493; 198/731
[58] Field of Search ............ 198/389, 408, 463.4, 198/493, 719, 731, 732

[56] References Cited
U.S. PATENT DOCUMENTS

| | | | |
|---|---|---|---|
| 1,920,563 | 8/1933 | Jahne | 198/408 |
| 3,212,620 | 10/1965 | Adams et al. | 198/493 |
| 4,091,915 | 5/1978 | Claasen | 198/389 |

Primary Examiner—Joseph E. Valenza
Attorney, Agent, or Firm—Lloyd B. Guernsey; R. C. Kamp; R. B. Megley

[57] ABSTRACT

A plastic cutlery feeder for receiving a backlog of cutlery items from a source and for feeding individual items in proper orientation and proper phase to a flighted conveyor of a wrapping machine. The backlogged items are received in a vertically oriented position by the cutlery feeder which changes the items to a horizontal orientation with a single item supplied to each flight of the wrapping machine conveyor.

15 Claims, 3 Drawing Sheets

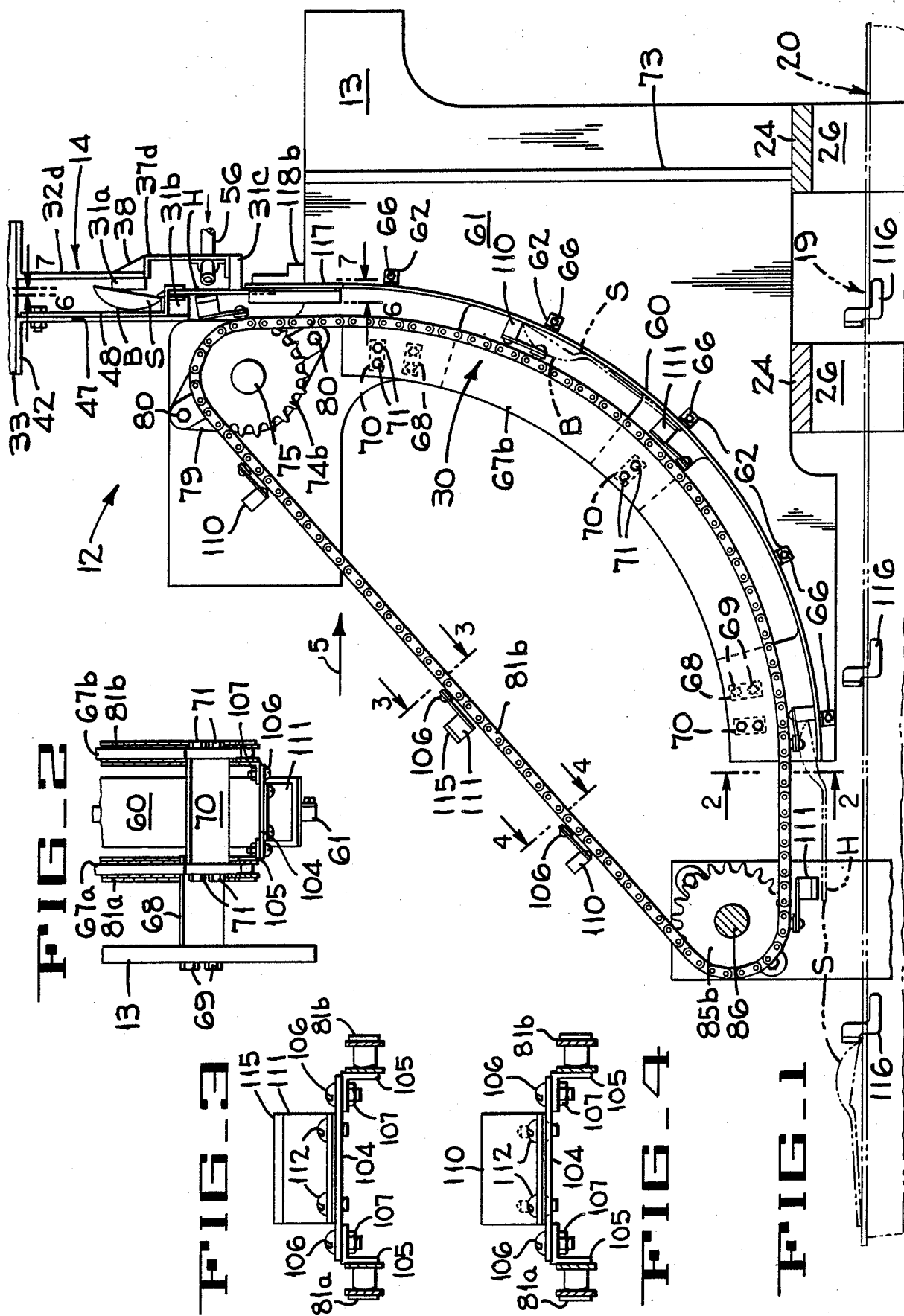

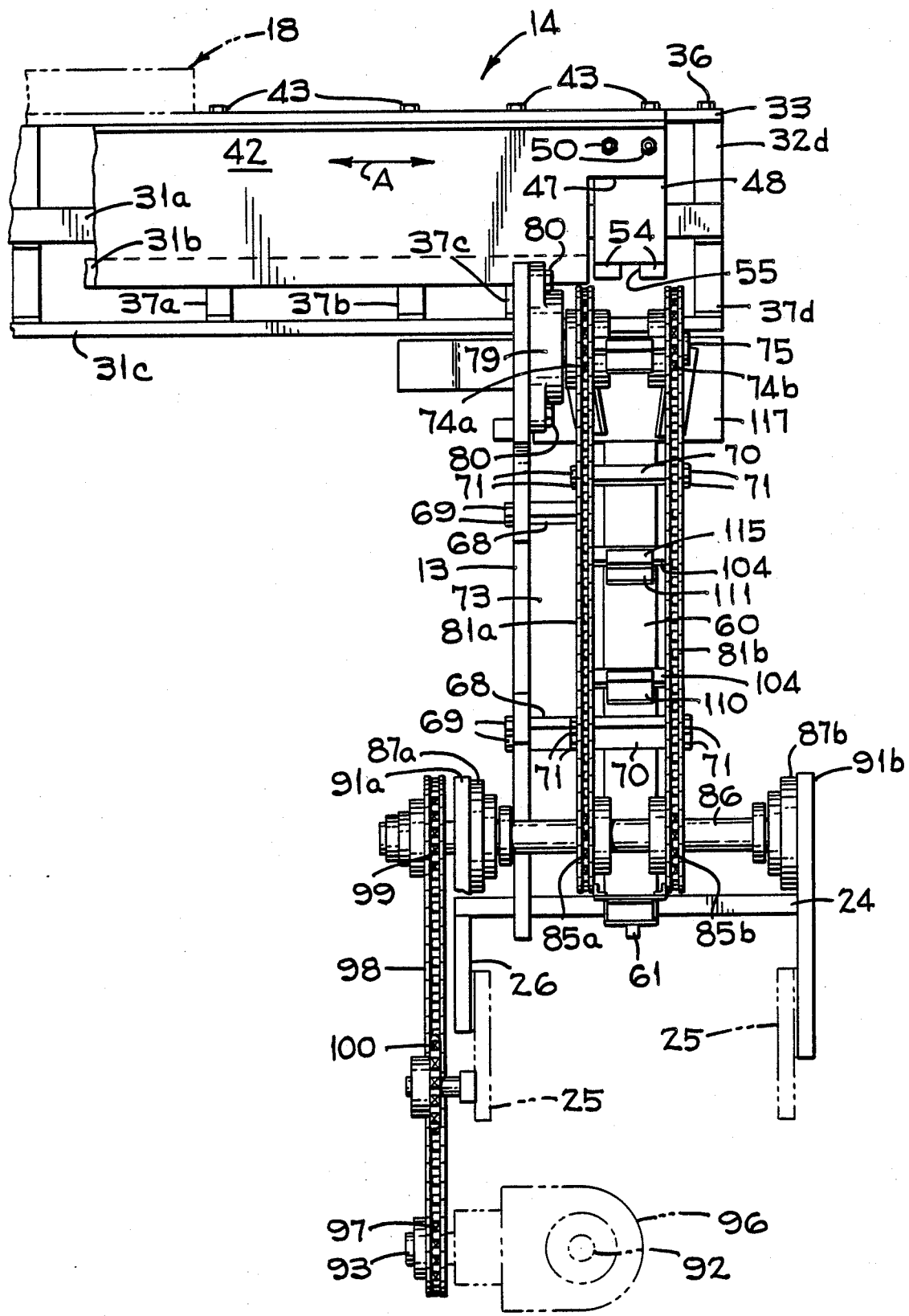

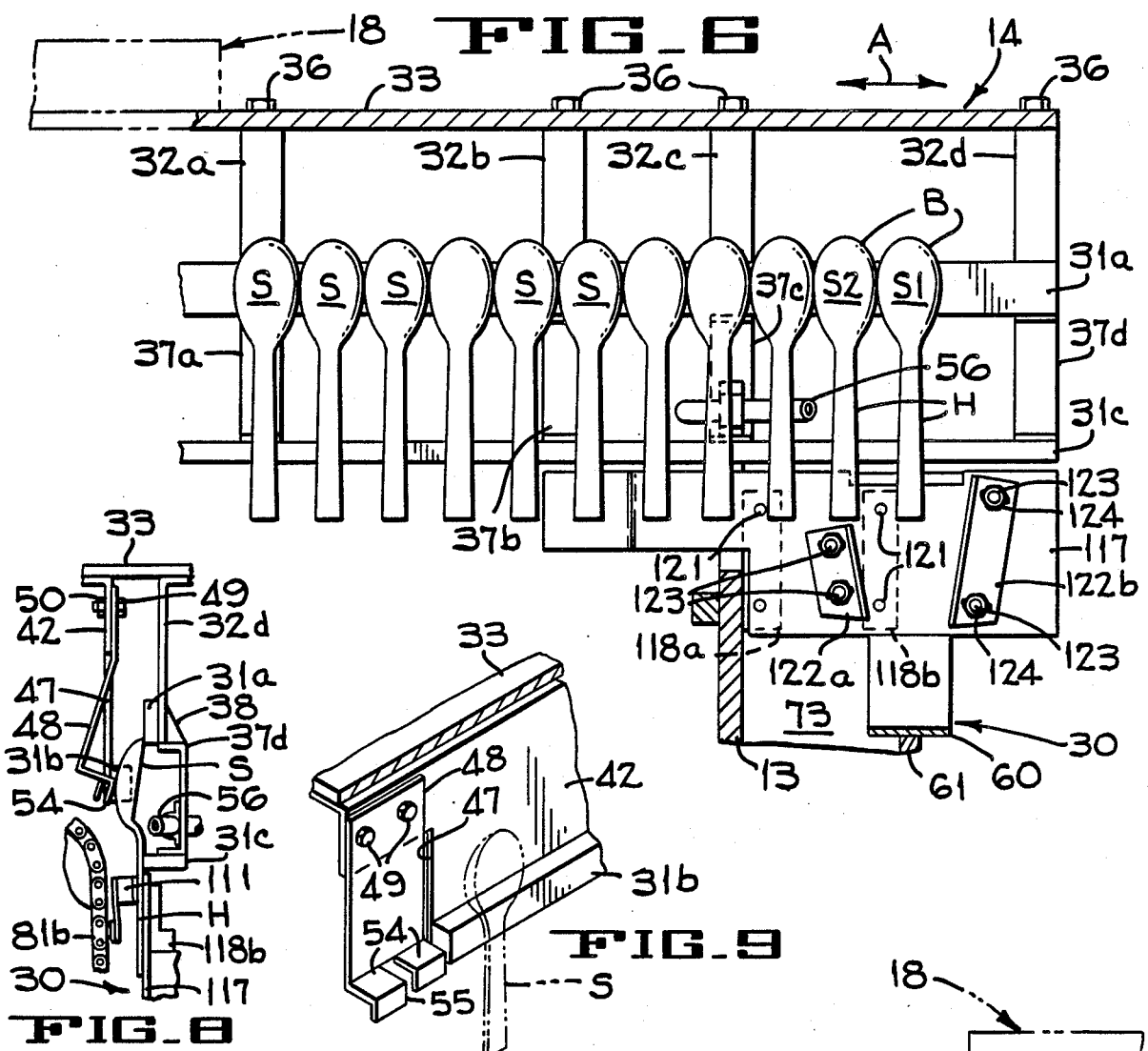
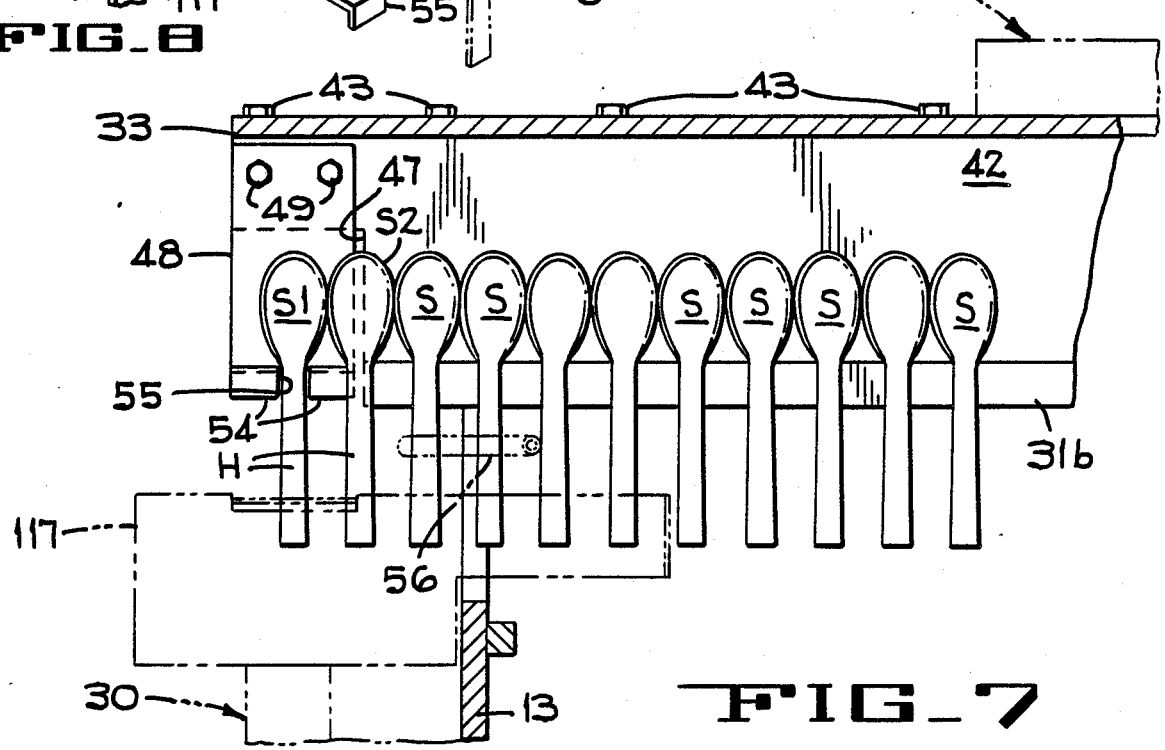

PLASTIC CUTLERY FEEDER

BACKGROUND OF THE INVENTION

The present invention relates to an automatic feeder, and more particularly, to an automatic feeder for receiving a backlog of cutlery items from a supply source and delivering individual items to an automatic wrapping machine.

There is a need for fast wrapping of large numbers of individual plastic cutlery for use in school lunch programs, airlines and fast food restaurants. Vibratory feeders can supply a continuous backlog of plastic cutlery items and high speed wrapping machines can package items at a rapid rate if single items can be supplied to the wrapping machine. Cost can be decreased and sanitation can be improved if hand feeding of the wrapping machine can be eliminated.

SUMMARY OF THE INVENTION

The present invention discloses a plastic cutlery feeder for receiving a continuous backlog of plastic cutlery items from a vibratory product feeder or other source of supply and for delivering individual items to a flighted conveyor of an automatic wrapping machine. The cutlery items are urged along a plurality of low friction guide rails in a vertical orientation from the source of supply to a position adjacent to a chute. Here a product holder intercepts the cutlery item nearest the chute and holds the item until a gripper grasps the item and delivers the item to the chute which guides the items downward and into proper orientation on a flighted conveyor of a wrapping machine. In the embodiment shown the individual items are placed on the flighted conveyor in a horizontally oriented position. A flighted chain assembly moves the items through the chute to insure that the items are properly phased relative to the flighted conveyor on the wrapping machine. The flighted conveyor of the wrapping machine is interconnected to the flighted chain assembly of the cutlery feeder to insure proper phasing of the items delivered to the wrapping machine conveyor.

BRIEF DESCRIPTION OF THE DRAWINGS

FIG. 1 is a side elevation of a plastic cutlery feeder of the present invention.

FIG. 2 is a cross-sectional view taken along line 2—2 of FIG. 1.

FIG. 3 is a cross-sectional view taken along line 3—3 of FIG. 1.

FIG. 4 is a cross-sectional view taken along line 4—4 of FIG. 1.

FIG. 5 is a front elevation taken in the direction of the arrow 5 of FIG. 1.

FIG. 6 is a cross-sectional view taken along line 6—6 of FIG. 1.

FIG. 7 is a cross-sectional view taken along line 7—7 of FIG. 1.

FIG. 8 is an enlarged view of a portion of FIG. 1 showing operation of the product holder.

FIG. 9 is an isometric drawing showing details of the product holder.

DESCRIPTION OF THE PREFERRED EMBODIMENT

A plastic cutlery feeder 12 of FIG. 1 includes a vertical plate 13 having a product feeder 14 (FIGS. 6, 7) mounted on an upper portion of plate 13. Cutlery feeder 12 receives a backlog of vertically oriented spoons S or other cutlery, from a source of supply 18 (FIG. 6) and delivers the spoons horizontally to a receiving conveyor 19 of a wrapping machine 20 (FIG. 1). The vertical plate 13 (FIGS. 1, 5, 6, 7) is mounted on a pair of cross braces 24 and is secured to a pair of receiving conveyor rails 25 by a plurality of vertical supports 26. Product feeder 14 moves spoons S from supply 18 and deposits them into a chute 30 which converts spoons S from a vertical to a horizontal orientation and places the horizontal spoons in proper phasing on conveyor 19.

Product feeder 14 includes a plurality of horizontal low-friction guide rails 31a–31c (FIGS. 1, 6–9) which guide spoons S from supply source 18 into a position of S1 (FIG. 7) immediately above chute 30. Rail 31a is attached to a plurality of brackets 32a–32d which are connected to a plate 33 of supply 18 by a plurality of capscrews 36 (FIGS. 1, 6, 8). Plate 33 is vibrated in the directions shown by an arrow A of FIG. 6 to urge spoons S from source 18 toward a position shown at S1. Rail 31c is attached to rail 31a by a plurality of angle brackets 37a–37d and gussets 38. Rail 31b is attached to a bracket 42 which is attached to plate 33 of supply 18 by a plurality of capscrews 43. All of the rails 31a, 31b, 31c vibrate in the same manner as supply source 18 as they are all interconnected. Bracket 42 (FIGS. 1, 8, 9) includes a notch 47 with a spring type of product holder 48 attached to bracket 42 by a pair of bolts 49 and nuts 50. The lower end portion of product holder 48 includes a pair of fingers 54 (FIGS. 7, 9) separated by a notch 55. As spoons S are urged along rails 31a, 31b, 31c from source 18, a spoon reaches position S2 where a puff of air from a jet 56 (FIGS. 6, 8) moves a spoon into a position S1 with the handle H resting in notch 55 as seen in FIG. 7. Notch 55 is immediately above chute 30 which can guide the spoons to receiving conveyor 19 of wrapping machine 20 (FIG. 1).

Chute 30 includes a curved trough 60 connected to a vertical plate 61 by a plurality of brackets 62 and a plurality of capscrews 66 (FIG. 1). A chain guide 67 is secured to vertical plate 13 by a plurality of spacers 68 and a plurality of capscrews 69. Another chain guide 67b is secured to chain guide 67a by a plurality of spacers 70 and a plurality of capscrews 71. Vertical plate 61 is welded or otherwise fastened to a plate 73 which is similarly fastened to vertical plate 13 (FIGS. 1, 5, 6). A pair of sprockets 74a, 74b are mounted on a shaft 75 extending into a bearing 79 (FIG. 5). Bearing 79 is connected to vertical plate 13 by a plurality of capscrews 80. A pair of chains 81a, 81b are threaded over sprockets 74a, 74b and extend through trough 60 and over a pair of sprockets 85a, 85b respectively. Sprockets 85a, 85b are mounted on a drive shaft 86 which is mounted in a pair of bearings 87a, 87b and connected to conveyor rails 25 by a pair of supports 91a, 91b.

To insure that the cutlery chains are properly timed relative to conveyor 19, power from a receiving conveyor line shaft 92 is coupled to feeder 12. Line shaft 92 is coupled to a drive shaft 93 by a gear box 96 and a drive sprocket 97 is mounted on shaft 93. Sprocket 97 powers a drive chain 98 which is connected to a sprocket 99 and chain 98 is tightened by an idler sprocket 100. Sprocket 99 drives shaft 86 which powers sprockets 85a, 85b and chains 81a, 81b.

Chains 81a, 81b are interconnected by a plurality of spacers 104, by a plurality of links 105, bolts 106 and nuts 107 (FIGS. 1–3, 4). A plurality of spring scrapers 110 and spring pads 111 are connected to spacers 104 by a plurality of capscrews 112. Spring pads or gripping means 111 each includes a cushion 115 for grasping a handle H of spoon S as a scraper 110 pushes spoon S out of trough 60 onto conveyor 19 in proper phasing relative to a flight 116 of conveyor 19 (FIG. 1).

A plate 117 which extends between an upper end of trough 60 and rail 31c (FIGS. 1, 6–8) is connected to vertical plates 13 and 61 by a pair of angle brackets 118a, 118b (FIG. 6) and a plurality of capscrews 121. A pair of guides 122a, 122b mounted on plate 117 by a plurality of bolts 123 and nuts 124 guide spoons S from position S1 into chute 30.

When cutlery feeder 12 starts operation the vibrating supply source 18 (FIG. 1) and rails 31a–31c move a parade of backlogged spoons S from left to right along rails 31a–31c until a spoon reaches location S2. A puff of air from jet 56 aids in positioning the spoon in position S1 with handle H in notch 55 (FIGS. 7, 9) of product holder 48. When the next spring pad 111 (FIGS. 1, 8) contacts handle H the spring pad 111 pulls spoon S (FIG. 8) downward causing the spring product holder 48 to flex as shown in FIG. 8 thereby releasing spoon S which travels down through trough 60 (FIG. 1). Spring scraper 110 presses against bowl B of spoon S to push the spoon through trough 60 and insure that spoon S is deposited immediately adjacent to a flight 116 of receiving conveyor 19 with the open side of bowl B facing downward.

Thus, the present invention receives cutlery items from a source of cutlery, arranges the items in a backlog, and feeds individual items in proper phasing to flights of a wrapping machine.

Although the best mode contemplated for carrying out the present invention has been herein shown and described, it will be apparent that modification and variation may be made without departing from what is regarded to be the subject matter of the invention.

What is claimed is:

1. A cutlery feeder for receiving a backlog of unpackaged cutlery items from a source of supply and for delivering individual items to a flighted conveyor of an automatic wrapping machine, said feeder comprising:
   a chute for guiding said items in a proper orientation to a flighted conveyor of a wrapping machine;
   guide means for receiving a backlog of cutlery items and for guiding said items along a path toward a position adjacent to said chute;
   gripping means cooperating with said chute for grasping a handle of an individual cutlery item disposed in position adjacent said chute; and
   a movable chain assembly aligned with said chute and carrying said gripping means for pulling said grasped item into said chute and thereafter for moving said individual items through said chute and delivering said individual items in timed relationship to said flighted conveyor of said wrapping machine.

2. A cutlery feeder as defined in claim 1 wherein said chute receives vertically oriented items from said source and changes said items into a horizontal orientation for delivery to said flighted conveyor of said wrapping machine.

3. A cutlery feeder as defined in claim 1 including a vibratory supply source for delivering said items to said chute.

4. A cutlery feeder for receiving a backlog of unpackaged cutlery items from a source of supply and for delivering individual items to a flighted conveyor of an automatic wrapping machine, said feeder comprising:
   a chute for guiding said items in a proper orientation to a flighted conveyor of a wrapping machine;
   a plurality of guide rails for receiving a backlog of vertically oriented cutlery items and for guiding said items along a path toward a position above said chute;
   a product holder for intercepting and releasably retaining an individual cutlery item from said backlog of items;
   a gripper cooperating with said chute for grasping a handle of said intercepted item adjacent said product holder; and
   a movable chain assembly aligned with said chute and carrying said gripping means for pulling said grasped item into said chute and thereafter for moving said individual items through said chute and delivering said individual items in timed relationship to said flighted conveyor of said wrapping machine.

5. A cutlery feeder as defined in claim 4 wherein said chute changes said items from a vertical orientation to a horizontal orientation for delivery to said flighted conveyor.

6. A cutlery feeder as defined in claim 4 wherein said product holder includes a notched spring for releasably holding a single intercepted item in position above said chute.

7. A cutlery feeder as defined in claim 4 wherein said intercepted item is the item nearest to said chute.

8. A cutlery feeder as defined in claim 4 including a blower positioned adjacent to said backlog of items, said blower being periodically actuated to move an item into an intercepted position in said product holder.

9. A cutlery feeder as defined in claim 4 wherein said flighted chain assembly delivers a single cutlery item to each flight of said conveyor of said wrapping machine.

10. A cutlery feeder as defined in claim 4 wherein said source of supply includes a vibratory feeder for delivering said items to said chute.

11. A cutlery feeder as defined in claim 4 wherein said chute delivers said items to said flighted conveyor with the handle of each item in a horizontal position.

12. A cutlery feeder as defined in claim 1 wherein said handle of said individual cutlery item is pulled into said chute ahead of other portions of said individual item to facilitate the delivery of a variety of types, sizes and shapes of cutlery items to a wrapping machine.

13. A cutlery feeder as defined in claim 4 wherein said handle of said individual cutlery item is pulled into said chute ahead of other portions of said individual item to facilitate the delivery of a variety of types, sizes and shapes of cutlery items to a wrapping machine.

14. A cutlery feeder for receiving a backlog of unpackaged cutlery items from a source of supply and for delivering individual items to a flighted conveyor of an automatic wrapping machine, said feeder comprising:
   a chute for guiding said items in a proper orientation to a flighted conveyor of a wrapping machine;
   a plurality of guide rails for receiving a backlog of vertically oriented cutlery items and for guiding said items along a path toward a position above said chute;
   a product holder having a notched spring for intercepting an individual cutlery item from said backlog of items and for releasably holding a single intercepted item in position above said chute;

a gripper cooperating with said chute for grasping said intercepted item at said product holder; and a movable chain assembly aligned with said chute and carrying said gripping means for urging said grasped item into said chute and thereafter for moving said individual items through said chute and delivering said individual items in timed relationship to said flighted conveyor of said wrapping machine.

15. A cutlery feeder as defined in claim 14 wherein a handle portion of said individual item is pulled into said chute ahead of other portions of said individual item to facilitate the delivery of a variety of types, sizes and shapes of cutlery items to a wrapping machine.

* * * * *